(12) United States Patent  
Choi et al.

(10) Patent No.: US 12,045,233 B2
(45) Date of Patent: Jul. 23, 2024

(54) DATABASE GROUP-BY QUERY CARDINALITY ESTIMATION

(71) Applicant: SAP SE, Walldorf (DE)

(72) Inventors: Kang Woo Choi, Seoul (KR); Daeun Lee, Seoul (KR); Dong Hun Lee, Seoul (KR)

(73) Assignee: SAP SE, Walldorf (DE)

( * ) Notice: Subject to any disclaimer, the term of this patent is extended or adjusted under 35 U.S.C. 154(b) by 3 days.

(21) Appl. No.: 17/979,643

(22) Filed: Nov. 2, 2022

(65) Prior Publication Data

US 2024/0143586 A1 May 2, 2024

(51) Int. Cl.
*G06F 16/245* (2019.01)
*G06F 16/2453* (2019.01)

(52) U.S. Cl.
CPC .. *G06F 16/24537* (2019.01); *G06F 16/24545* (2019.01)

(58) Field of Classification Search
CPC .............. G06F 16/24537; G06F 16/24545
See application file for complete search history.

(56) References Cited

FOREIGN PATENT DOCUMENTS

WO    WO 2019/048879 A1 * 3/2019

\* cited by examiner

*Primary Examiner* — Baoquoc N To
(74) *Attorney, Agent, or Firm* — Fountainhead Law Group P.C.

(57) ABSTRACT

Mechanisms are disclosed for estimating cardinality of group-by queries. A probability of occurrence of values is obtained for columns that satisfy the query occurring in tables from a trained machine learning model. A range selectivity is calculated based on a conditional probability of occurrence of the values. A set of valid generated sample tuples is generated from the trained machine learning model. A group-by selectivity is calculated by keeping the conditional probability of occurrence to obtain probabilities that a result set will have specific group-by column values associated with the tables while proceeding with progressive sampling. A sampling probability is calculated by normalizing the group-by selectivity by dividing the group-by selectivity by the range selectivity. The samples are filtered such that the samples having a sampling probability below a sampling probability threshold are filtered out. A sampling-based estimator is applied to the filtered samples set to estimate the cardinality.

20 Claims, 5 Drawing Sheets

TABLE T1

| X1 | X2 | X3 | P(O) |
|----|----|----|------|
| 1  | 1  | A  | 1/6  |
| 0  | 1  | B  | 1/6  |
| 2  | 2  | C  | 1/6  |
| 3  | 3  | C  | 1/6  |
| 6  | 3  | A  | 1/6  |
| 7  | 4  | D  | 1/6  |

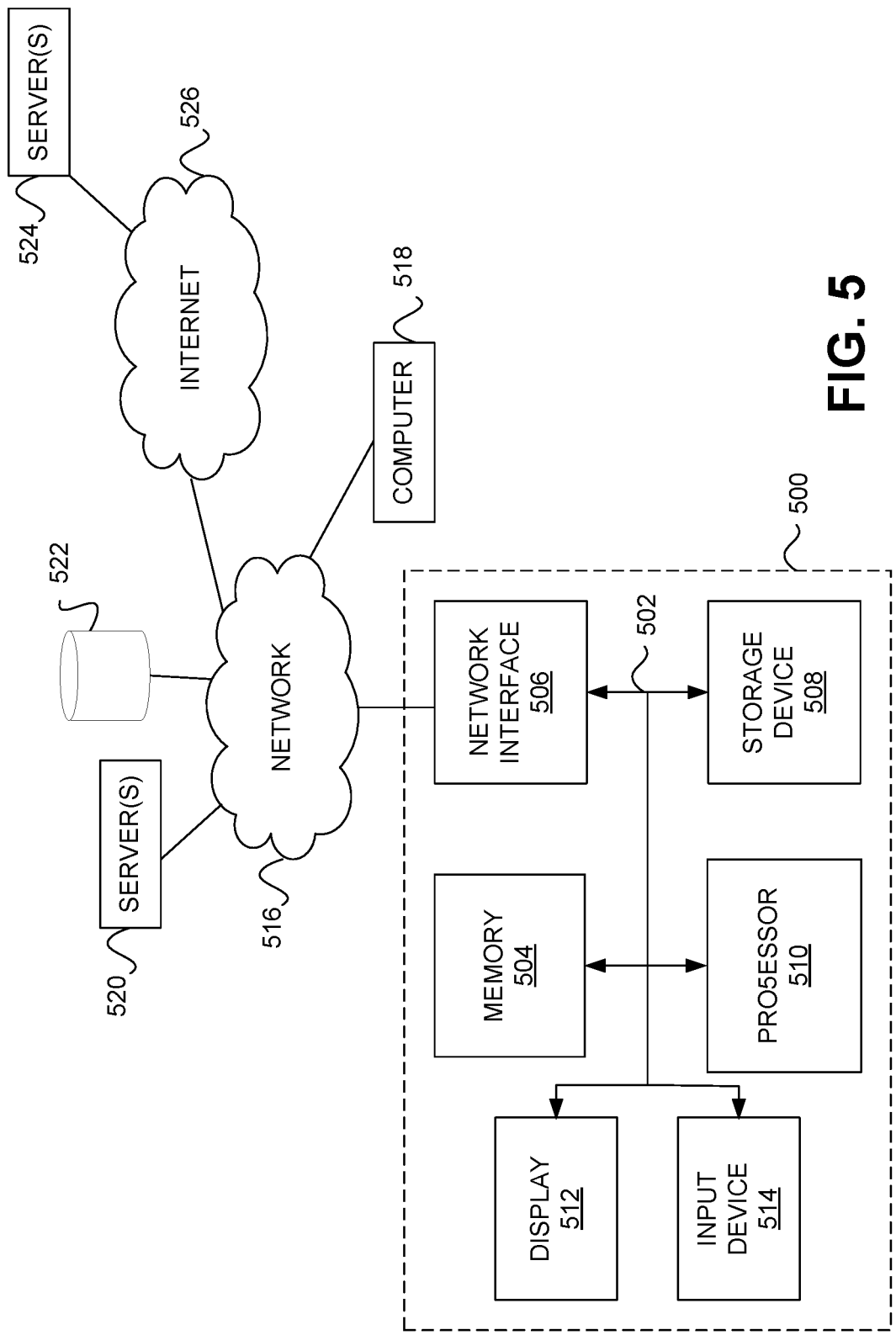

DATABASE GROUP-BY QUERY CARDINALITY ESTIMATION

TECHNICAL FIELD

Embodiments generally relate to cardinality estimation in database management systems (DBMS), and more particularly to estimating cardinality of a query as a number of rows, or intermediate results, from a specific operation in a query plan for a DBMS query.

Cardinality estimation in a DBMS is an important aspect of the DBMS that is responsible for generating improved query plans for executing queries. A query plan involves several query operations in a tree structure to execute a structured query language (SQL) statement. Various equivalent query plans may exist for a particular SQL query. A DBMS query optimizer then typically chooses a query plan that has the lowest cost among the various equivalent query plans, in order provide results associated with the particular SQL query as fast as possible. Plan enumeration for cost-based query optimization involves estimating a cost associated with each query operation using estimated cardinality. In general, the smaller the size of each intermediate result, the lower the cost of a particular query.

Obtaining accurate cardinality estimates, i.e., estimating distinct value counts within intermediate results is inherently challenging. It is typically infeasible to estimate the number of distinct intermediate values without actually materializing a result table. Cardinality estimations typically entail filters and join conditions. To concretely determine the number of distinct values, the result table of filters and joins would need to be pre-computed. Performing such a pre-computation is problematic, however, since the selecting an optimal query plan inherently requires an estimate of the cardinality before computing results. Moreover, cardinality estimation is typically carried out in connection with join and filters. When prediction errors associated with cardinality estimation begin to grow, such errors compound, leading to even worse cardinality estimations.

Some traditional cardinality estimations involve sampling-based methods, whereby samples from real data are obtained in order to estimate distinct value counts in the overall data based on frequency or probabilities of a (relatively) small number of samples. Some other existing cardinality estimations involve histogram approaches. Rather than using actual sampled data, histogram approaches use pre-calculated statistics. However, estimation depending solely on statistics may lead to substantially lower accuracy. A limited number of histogram bins may yield inaccurate statistics. Estimation using a single-column histogram under an assumption that columns are independent would result in poor results (overestimating cardinality) with real-world data for which such an assumption of independence between columns is unrealistic, because real world columns such as city name and zip code, for example would not be independent. Using a multi-column histogram may result in very high scaling costs and associated overhead and is therefore typically not practical. Accordingly, what is needed is an efficient mechanism for cardinality estimation in a database management system that overcomes the above-described problems and challenges.

SUMMARY

Disclosed embodiments address the above-mentioned problems by providing one or more non-transitory computer-readable media storing computer-executable instructions that, when executed by a processor, perform a method for cardinality estimation associated with a query performed in connection with a database management system, the method comprising: obtaining a probability of occurrence of values for each column that satisfies the query occurring in one or more tables from a trained machine learning model, calculating a range selectivity based on the probability of occurrence of the values, generating from the trained machine learning model a set of valid generated sample tuples that satisfy the query, calculating a group-by selectivity by keeping the original probability of occurrence to obtain one or more probabilities that a result set will have specific group-by column values associated with the one or more tables while proceeding with progressive sampling, calculating a sampling probability by normalizing the group-by selectivity by dividing the group-by selectivity by the range selectivity, filtering the population of samples to form a filtered population of samples, wherein the samples having a sampling probability below a sampling probability threshold are filtered out, and applying a sampling-based estimator to the filtered population of samples to provide the group-by cardinality estimation.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE DRAWING FIGURES

Embodiments are described in detail below with reference to the attached drawing figures, wherein:

FIG. 3 shows an example table and associated query for describing how to estimate group-by selectivity.

FIG. 5 is a diagram illustrating a sample computing device architecture for implementing various aspects described herein.

Figure 1:
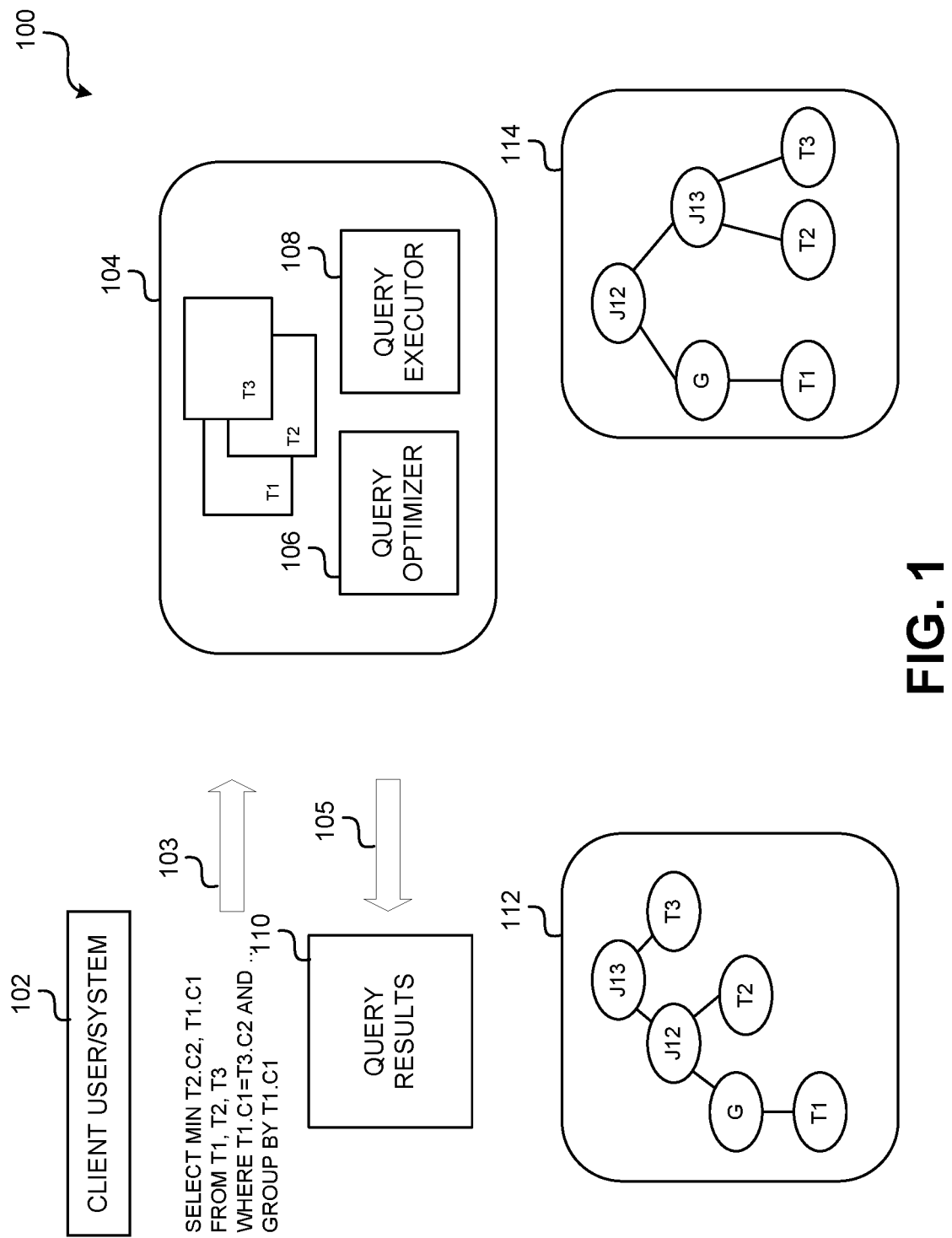
FIG. 1 is a system diagram illustrating a selection of a more performant query plan consistent with the present teachings.

The drawing figures do not limit the present teachings to the specific embodiments disclosed and described herein. The drawings are not necessarily to scale, emphasis instead being placed upon clearly illustrating the principles of the disclosure.

DETAILED DESCRIPTION

The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the present teachings in sufficient detail to enable those skilled in the art to practice the present teachings. Other embodiments can be utilized, and changes can be made without departing from the claims. The following detailed description is, therefore, not to be taken in a limiting sense. The scope of embodiments is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Overview

The present teachings describe methods and systems to use machine learning to apply certain statistical estimators to produce group-by cardinality estimations. Group-by cardinality estimation involves estimating a number of rows or size of intermediate result that will result from a specific operation in a particular query plan. Incorrect size estimations can result in selection of suboptimal query plans that lead to poor performance of a DBMS. Application of machine learning can have significant benefits in estimating group-by cardinality. There are generally at least two types of machine learning approaches that can be used for this purpose. A first type may be referred to as data-driven learning, which may be employed to infer joint distribution of data from all data sources and may involve either unsupervised or self-supervised machine learning. Alternatively, supervised machine learning may be employed to yield practical advantages from the point of view of query-driven learning, which involves learning based on query statements that are provided in specific formats. Data driven deep-learning based cardinality estimation has several advantages over a query-driven approach. First, data driven estimation allows a model to learn joint distribution of the data and be unsupervised or self-supervised, whereas query-driven estimation must be trained on specific queries and requires true cardinalities to be pre-calculated for the training, which is to say that pre-calculation is extremely resource intensive. Data driven estimation also has the benefit of being able to predict queries with fewer restrictions as well as requiring less human intervention than query-driven estimation. Group-by cardinality estimation is important because group-by cardinality estimation is one of the key query operations to make an optimal query plan. Since real-world SQL queries frequently need set-wise aggregations, pre-aggregation can reduce intermediate result size for many queries.

In some embodiments, inference may be provided via progressive sampling. An objective of progressive sampling is to estimate selectivity from the trained joint probabilities of generated imaginary tuples or samples that satisfy the query from a trained auto regression (AR) model. Looping through certain order of sampling, progressive sampling calculates each selectivity estimate from each sample, whose average provides the final selectivity estimate. Progressive sampling is invented particularly for the sake of the efficiency, which may be different depending on which sample is chosen. To achieve sufficient accuracy with relatively small samples, it is advantageous to be able to create meaningful samples. Progressive sampling successfully solves this challenge by generating such meaningful or plausible samples from conditional probabilities that reflect real-world data values better. Hence, progressive sampling is preferable to random or uniform sampling, because if data are highly skewed, a desired sample size when using random or uniform sampling to get high-mass value (or plausible) values increases. This may be accomplished by calculating one or more conditional probabilities to sample from. Instead of randomly selecting valid instances, progressive sampling samples from conditional probabilities given previous sample instances. Each instance candidates may have different probabilities to be sampled, which navigates selections into more meaningful regions of the data set.

Since not all points in a query region are meaningful, techniques are needed to sample from a desired query region. Progressive sampling samples from the conditional probability, where meaningfulness of each data point has been already reflected. By so doing, the chances of having meaningful samples with smaller sample size increases.

Distinct value counting with probabilistic estimation involves sampling-based statistical estimation. Sampling-based estimation involves using a sampling probability of a particular data point being chosen as a sample. Sampling-based methods assume probability sampling where each sample candidate has a non-zero probability of being sampled based on a population of data points to sample from. To accomplish this, it is beneficial to get one or more real samples from a valid population and use the probability of occurrence of the sample from the population. Hence to estimate group-by cardinality with a sampling-based method, the following steps may be performed. First, a valid proper population is defined based on intermediate results after processing join and filter condition; Next, samples are taken from the valid proper population. It is generally practically infeasible to materialize the result table to sample from, hence, such samples may be generated in connection with a trained AR model. Finally, a sampling probability is calculated for each sample. This is the same as the probability that the specific value from valid/defined population would be sampled. This leads to the probability of occurrence being the sampling probability if the probability of occurrence is re-calculated based on the valid proper population.

Operational Environment for Embodiments

FIG. 1 is a system diagram 100 illustrating a selection of a more performant query plan consistent with the present teachings. Client user or system 102 may provide a database query to DBMS 104. In some embodiments, the database query may be a SQL statement such as the SQL select statement illustrated in FIG. 1, which may be submitted (by way of arrow 103) to DBMS 104. The statement in FIG. 1 is "SELECT MIN T2.C2, T1.C1 FROM T1, T2 WHERE T1.C1=T3.C2 AND . . . GROUP BY T1.C1" It is understood that this statement involves a table join and a group-by aggregation, which may yield (at arrow 105) results 110 based on a query execution that may be performed by query executor 108 based on one or more query plans generated by query optimizer 106. Two possible query plans, query plan 112 and query plan 114 are shown. In some embodiments, query optimizer 106 may use techniques consistent with the present teachings to select either of query plan 112 or query plan 114, depending on which query plan will provide more performant execution of the query.

Figure 2A:
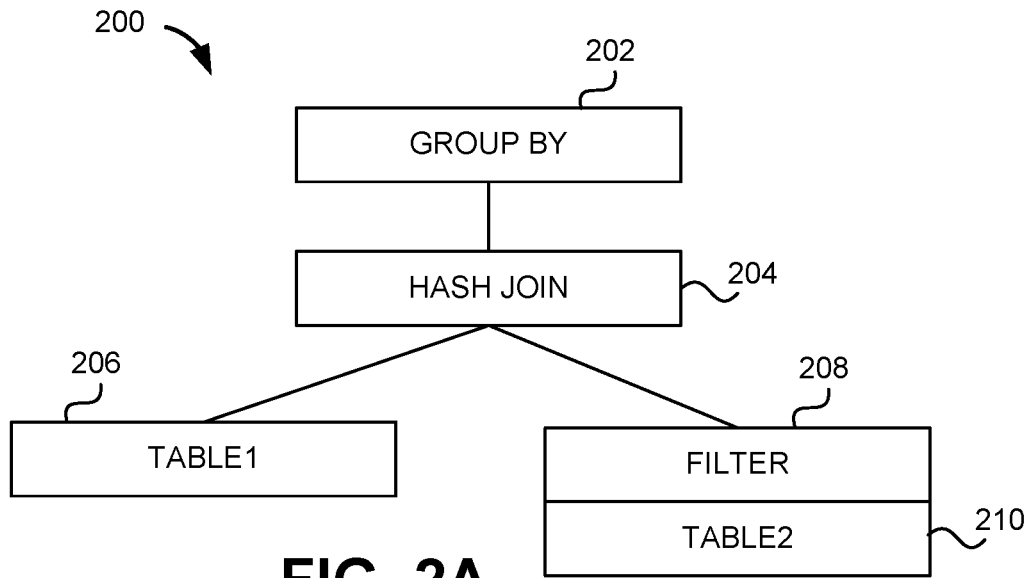
FIGS. 2A and 2B are query plan diagrams illustrating example query plans that show an optimization using pre-aggregation before a performing a join.

FIG. 2A is a query plan diagram 200 illustrating an example query plan not employing a group-by optimization using pre-aggregation before a performing a join. FIG. 2A shows a query optimization example on group-by operation 202. In diagram 200, the sample query gathers the aggregation information against two joined tables (table 206 and table 210) using hash join 204. One of the two tables has a filter condition 208. Frequently, a join of two tables generates a large number of intermediate results and in an improved process, a group-by operation may be performed before joining of the intermediate results as set forth below in connection with FIG. 2B.

Figure 2B:
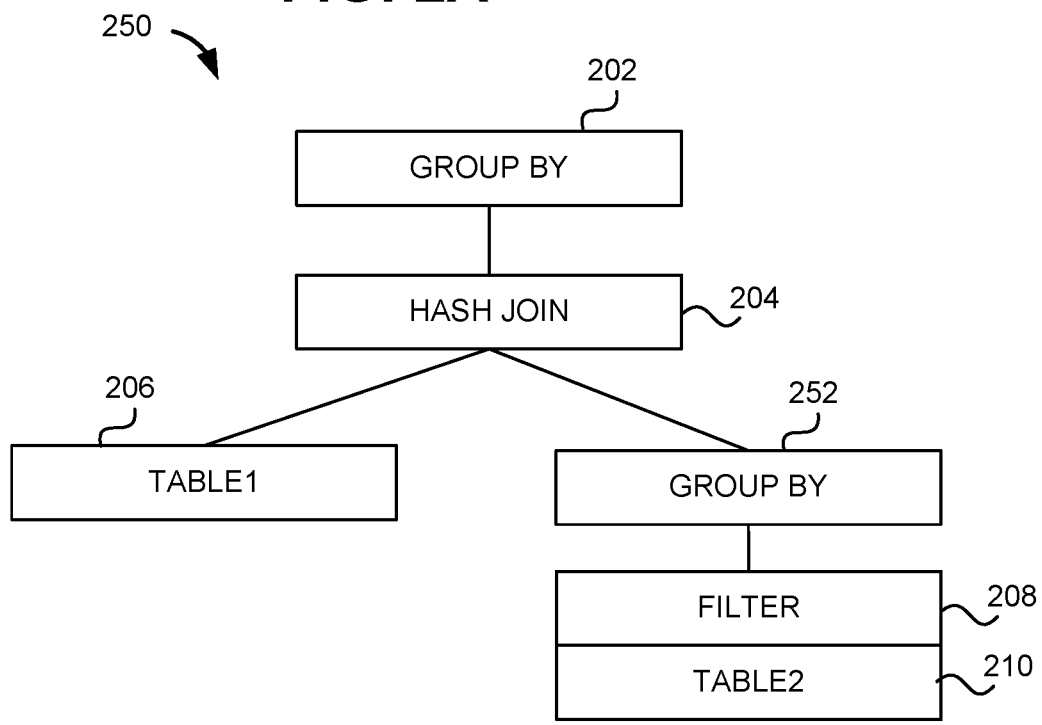

FIG. 2B is a query plan diagram 250 illustrating example query plans employing a group-by optimization using pre-aggregation before a performing a join. In FIG. 2B, by pushing down the whole or a portion of group by operation (to group by operation 252) before the join operation, in many cases, the output size of the join operation can be reduced, because the output size of group-by is usually less than the cardinality of the filtered table. As the output size of each operation is closely related with the latency of a query, the overall query processing can be accelerated by reducing the intermediate result size. In this example, the query can be accelerated by pushing down group-by operation before the join operation.

FIG. 3 shows an example table 300 and associated query for describing how to estimate group-by selectivity. Given table T1 as shown in FIG. 3, where there are three columns X1, X2 and X3, assume execution of the following query: Select Max(x1) from T1 where x1<=5 and x2 in [1, 2, 3] group by X2. For the sake of illustration, it is assumed that each tuple has a same probability of occurrence, which is 1/|Table T1's size|=⅙. Out of six rows in T1, the first four rows satisfy the given query, which are shown within region 302. Since there are three possible X2 values—1, 2 and 3 within valid query region 302, three different group-by selectivities may be calculated. To obtain group by selectivity, the probability of occurrence of tuples of specific group-by predicated column value that still satisfy the query may be calculated. Therefore, for group-by selectivity with X2=1, there are two tuples/possibilities, namely: (1, 1, A) and (0, 1, B). Then the probability of getting tuple that both satisfy the given query and has 1 to X2 column value out of T1 is ⅙+⅙=⅓. Similar logic applies to the other to (x2=2, x2=3). Since there is only one tuple that has X2 value to 2 and satisfy the query, (2, 2, C), the group-by selectivity for X2=2 is (2, 2, C) which has a probability of occurrence of ⅙.

Region 302 corresponds to a valid query region. The original objective of progressive sampling involves estimating range selectivity, which is the probability of all possible tuples of a single table or joined tables to satisfy the query. The population for this probability is the entire table, which would be a single table in single-table estimation or joined tables in multi-table estimation. Group-By selectivity is the probability of selecting a tuple with a specific group-by combination value, which yet satisfies the given query. Therefore, the disclosed embodiment estimates this group-by selectivities by treating the original query as if it is a union of equal predicates of each group-by value combination. Group-by selectivity can be estimated while estimating the range selectivity, and group-by selectivity is defined to have the entire table for its population as well.

Normalization relates to a characterization of any adjustment that needs to be made to the sample. Group-by selectivity relates to a probability of drawing a tuple with a certain combination from an entire table, not from a valid query region. However, a sampling probability for each group-by combination values is a probability of drawing a tuple with a certain combination from the tuples that satisfy all predicates e.g., the probability that T1.X2=2 (from tuples in region 302 in table T1 of FIG. 3). Accordingly, group-by selectivity is normalized by means of range selectivity. Selectivity may be defined as a fraction of rows in a table or partition that is chosen by a predicate or query. Under such a definition, range selectivity may be defined as the ratio of range cardinality over all possible numbers of rows over one table or joins of multiple tables. A sampling probability is calculated by normalizing the group-by selectivity by dividing the group-by selectivity by the range selectivity. The normalization is done at the group-by combination value level.

Filtering out imaginary samples may be carried out in order to map products of machine learning inferences to statistical estimators. In principle, all machine learning generated samples are imaginary samples, rather than real world values. Accordingly, some generated samples might never even occur in real world database tables. Therefore, some generated samples may be properly excluded if they are highly unlikely to happen in a real dataset. After normalization, samples with smaller normalized probabilities than the estimated range selectivity may be dropped. The dropped samples will not be used in calculating sampling probability. Filtering criteria involves taking a maximum number of distinct values. The possible maximum number of distinct values becomes the population size, where all values are distinct. Hence, the minimum sampling probability would be 1/all distinct value=1/the cardinality of valid query region. Accordingly, samples with a probability less than the estimated range selectivity are dropped. Initially, all samples are included to estimate selectivities (both range and group-by), however, only filtered samples would be used in calculating sampling probabilities. The rest of the samples may be averaged per distinct group-by combinations to get the sampling probability respectively.

Statistical estimators may be applied to estimate distinct counts based on the sampling probabilities of each combination. In statistics, the Horvitz-Thompson estimator is a method for estimating the total and mean of a pseudo-population in a stratified sample. The Horvitz-Thompson estimator is frequently applied in survey analyses and can be used to account for missing data, as well as many sources of unequal selection probabilities.

The embodiment also provides two additional estimators that are from traditional statistics literature. The invented Expected Frequency estimator estimates the distinct number of combinations by compensating the difficulty measure. Given that all samples follow multinomial distribution, the expected frequency of value would represent how difficult a particular value would be to be observed. Compensation may be applied according to this difficulty measure, which is to say the more difficult it is to observe a particular value, the more valuable its information may be. The bounding estimator starts with getting exact valid size of each column using a byproduct of using an AR model to produce much smaller upper bound and calculates the geometric mean of a lower (pre-defined) and newly gotten upper bound.

Figure 4:
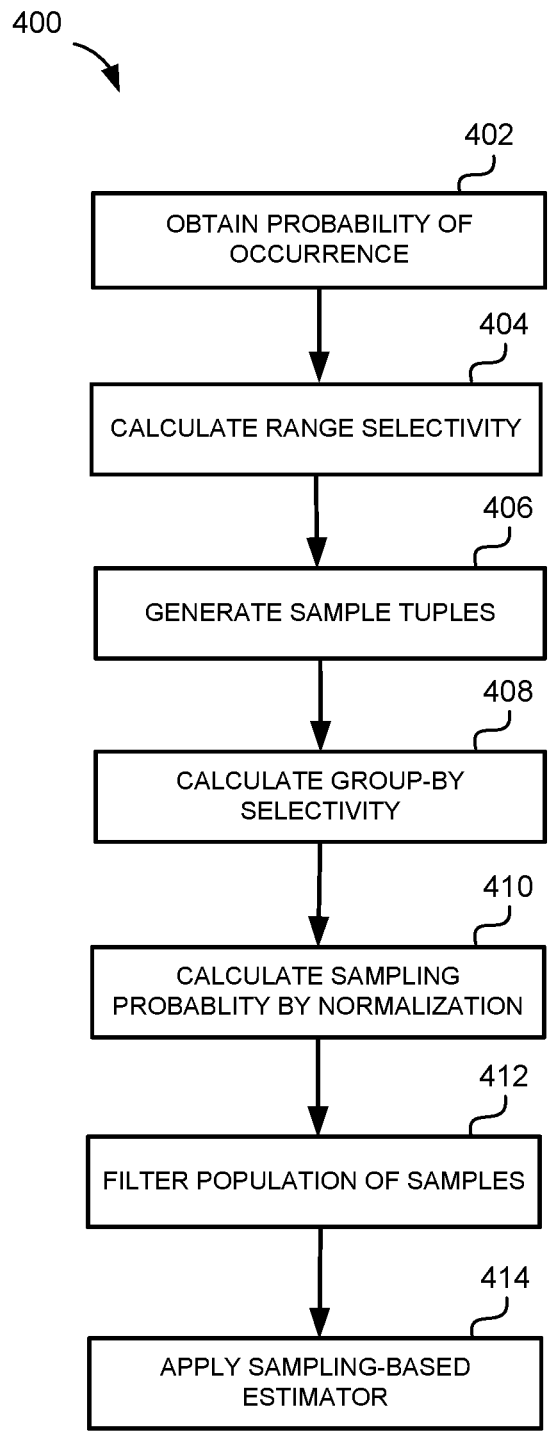
FIG. 4 is a flow diagram illustrating an example method for group-by cardinality estimation in a database management system according to certain embodiments.

FIG. 4 is a flow diagram 400 illustrating an example method for group-by cardinality estimation in a database management system according to certain embodiments. First, at step 402, a probability of occurrence is obtained, the probability of occurrence corresponding to values for each column that satisfies the query occurring in one or more tables from a trained machine learning model. Next at step 404, range selectivity is calculated based on the probability of occurrence of the values. Range selectivity corresponds to the ratio of range cardinality over all possible numbers of rows over one table or joins of multiple tables. Next, at step 406, from the trained machine learning model, a set of valid generated sample tuples that satisfy the query are generated.

Next, at step 408, a group-by selectivity is calculated by keeping the original probability of occurrence to obtain one or more probabilities that a result set will have specific group-by column values associated with the one or more tables while proceeding with progressive sampling. Next, at step 410, a sampling probability is calculated by normalizing the group-by selectivity by dividing the group-by selectivity by the range selectivity. Next, as step 412, the population of samples is filtered to form a filtered samples, wherein the samples having a sampling probability below a sampling probability threshold are filtered out. Next at step 414, a sampling-based estimator may be applied to the filtered samples to provide the group-by cardinality estimation. The sampling probability threshold may be greater than the estimated range selectivity. The sampling-based estimator may be a Horvitz-Thompson estimator, and other estimators. Other non-traditional estimators such as a bounding estimator or an expected frequency estimator are also provided in the embodiment.

FIG. 5 is a diagram illustrating a sample computing device architecture for implementing various aspects described herein. Computer 500 can be a desktop computer, a laptop computer, a server computer, a mobile device such as a smartphone or tablet, or any other form factor of general—or special-purpose computing device containing at least one processor that may be employed to cause actions to be carried out. Depicted with computer 500 are several components, for illustrative purposes. Certain components may be arranged differently or be absent. Additional components may also be present. Included in computer 500 is system bus 502, via which other components of computer 500 can communicate with each other. In certain embodiments, there may be multiple busses or components may communicate with each other directly. Connected to system bus 502 is processor 510. Also attached to system bus 502 is memory 504. Also attached to system bus 502 is display 512. In some embodiments, a graphics card providing an input to display 512 may not be a physically separate card, but rather may be integrated into a motherboard or processor 510. The graphics card may have a separate graphics-processing unit (GPU), which can be used for graphics processing or for general purpose computing (GPGPU). The graphics card may contain GPU memory. In some embodiments no display is present, while in others it is integrated into computer 500. Similarly, peripherals such as input device 514 is connected to system bus 502. Like display 512, these peripherals may be integrated into computer 500 or absent. Also connected to system bus 502 is storage device 508, which may be any form of computer-readable media, such as non-transitory computer readable media, and may be internally installed in computer 500 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface 506 is also attached to system bus 502 and allows computer 500 to communicate over a network such as network 516. Network interface 506 can be any form of network interface known in the art, such as Ethernet, ATM, fiber, Bluetooth, or Wi-Fi (i.e., the Institute of Electrical and Electronics Engineers (IEEE) 802.11 family of standards). Network interface 506 connects computer 500 to network 516, which may also include one or more other computers, such as computer 518, server(s) 520, and network storage, such as cloud network storage 522. Network 516 is in turn connected to public Internet 526, which connects many networks globally. In some embodiments, computer 500 can itself be directly connected to public Internet 526 as well as one or more server(s) 524.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random-access memory associated with one or more physical processor cores.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the invention has been described with reference to the embodiments illustrated in the attached drawing figures, it is noted that equivalents may be employed, and substitutions made herein without departing from the scope of the invention as recited in the claims. The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the disclosed invention in sufficient detail to enable those skilled in the art to practice the invention. Other embodiments can be utilized, and changes can be made without departing from the claimed scope of the invention. The following detailed description is, therefore, not to be taken in a limiting sense. The scope of embodiments is defined only by the appended claims, along with the full scope of equivalents to which such claims are entitled.

Having thus described various embodiments of the invention, what is claimed as new and desired to be protected by Letters Patent includes the following:

The invention claimed is:

1. One or more non-transitory computer-readable media storing computer-executable instructions which, when executed by a processor, perform a method for cardinality estimation associated with a group-by query performed in connection with a database management system, the method comprising:
   obtaining a probability of occurrence of values for each column which satisfies the query occurring in one or more tables from a trained machine learning model;
   calculating a range selectivity based on the probability of occurrence of the values;
   generating from the trained machine learning model a set of valid generated sample values per each column which satisfy the query;
   calculating a group-by selectivity by keeping an original probability of occurrence to obtain one or more probabilities of a result set will having specific group-by column values associated with the one or more tables while proceeding with progressive sampling;
   calculating a sampling probability by normalizing the group-by selectivity by dividing the group-by selectivity by the range selectivity;
   filtering samples to form a filtered samples, wherein the samples having a sampling probability below a sampling probability threshold are filtered out; and
   applying a sampling-based estimator to the filtered samples to provide the group-by cardinality estimation.

2. The non-transitory computer-readable media of claim 1, wherein the query is treated as a union of equal predicates of each group by combination value.

3. The non-transitory computer-readable media of claim 1, wherein the progressive sampling provides an estimate of the range selectivity.

4. The non-transitory computer-readable media of claim 3, wherein computing each group by selectivity is carried out through the progressive sampling while range selectivity estimation is performed using progressive sampling.

5. The non-transitory computer-readable media of claim 4, wherein computing each group by selectivity further comprises:
   storing a sampled value in connection with a conditional probability of the sampled value; and
   averaging the selectivity for each group-by combination value to produce a plurality of group-by selectivity values.

6. The non-transitory computer-readable media of claim 3, wherein the sampling probability threshold is greater than the estimated range selectivity.

7. The non-transitory computer-readable media of claim 1, wherein the sampling-based estimator is one of: a Horvitz-Thompson estimator, an expected frequency estimator, or a bounding estimator.

8. A method for group-by cardinality estimation in a database management system, the method comprising:
   obtaining a probability of occurrence of values for each column which satisfies a query occurring in one or more tables from a trained machine learning model;
   calculating a range selectivity based on the probability of occurrence of the values;
   generating from the trained machine learning model a set of valid generated sample values per each column which satisfy the query;
   calculating a group-by selectivity by keeping an original probability of occurrence to obtain one or more probabilities of a result set having specific group-by column values associated with the one or more tables while proceeding with progressive sampling;
   calculating a sampling probability by normalizing the group-by selectivity by dividing the group-by selectivity by the range selectivity;
   filtering a population of samples to form a filtered samples, wherein the samples having a sampling probability below a sampling probability threshold are filtered out; and
   applying a sampling-based estimator to the filtered samples to provide the group-by cardinality estimation.

9. The method of claim 8, wherein the query is treated as a union of equal predicates of each group by combination value.

10. The method of claim 9, wherein the progressive sampling provides an estimate of the range selectivity.

11. The method of claim 10, wherein computing each group by selectivity is carried out through the progressive sampling while range selectivity estimation is performed using progressive sampling.

12. The method of claim 11, wherein computing each group by selectivity further comprises:
   storing a sampled value in connection with a conditional probability of the sampled value; and
   averaging the selectivity for each group-by combination value to produce a plurality of group-by selectivity values.

13. The method of claim 10, wherein the sampling probability threshold is greater than the estimated range selectivity.

14. The method of claim 8, wherein the sampling-based estimator is one of: a Horvitz-Thompson estimator, an expected frequency estimator, or a bounding estimator.

15. A system for group-by cardinality estimation in a database management system, the system comprising:
   at least one processor;
   and at least one non-transitory memory storing computer executable instructions which when executed by the at least one processor cause the system to carry out actions comprising:
   obtaining a probability of occurrence of values for each column which satisfies a query occurring in one or more tables from a trained machine learning model;
   calculating a range selectivity based on the probability of occurrence of the values;
   generating from the trained machine learning model a set of valid generated sample values per each column which satisfy the query;
   calculating a group-by selectivity by keeping an original probability of occurrence to obtain one or more probabilities of a result set will having specific group-by column values associated with the one or more tables while proceeding with progressive sampling;
   calculating a sampling probability by normalizing the group-by selectivity by dividing the group-by selectivity by the range selectivity;
   filtering a population of samples to form a filtered samples, wherein the samples having a sampling probability below a sampling probability threshold are filtered out; and
   applying a sampling-based estimator to the filtered population of samples to provide the group-by cardinality estimation.

16. The system of claim 15, wherein the query is treated as a union of equal predicates of each group by combination value.

17. The system of claim 15, wherein the original progressive sampling provides an estimate of the range selectivity.

18. The system of claim 17, wherein computing each group by selectivity is carried out through the progressive sampling while range selectivity estimation is performed using progressive sampling.

19. The system of claim 18, wherein computing each group by selectivity further comprises:
   storing a sampled value in connection with a joint probability of the sampled value; and
   averaging the selectivity for each group-by combination value to produce a plurality of group-by selectivity values.

20. The system of claim 17, wherein the sampling probability threshold is greater than the estimated range selectivity.

* * * * *